Sept. 29, 1931.  F. A. SPACSEK  1,825,133
SLED ATTACHMENT FOR AUTOMOBILES
Filed July 25, 1928  3 Sheets-Sheet 1

FRANK A. SPACSEK. INVENTOR

BY Martin & Rendell

ATTORNEYS

Sept. 29, 1931.  F. A SPACSEK  1,825,133
SLED ATTACHMENT FOR AUTOMOBILES
Filed July 25, 1928  3 Sheets-Sheet 2
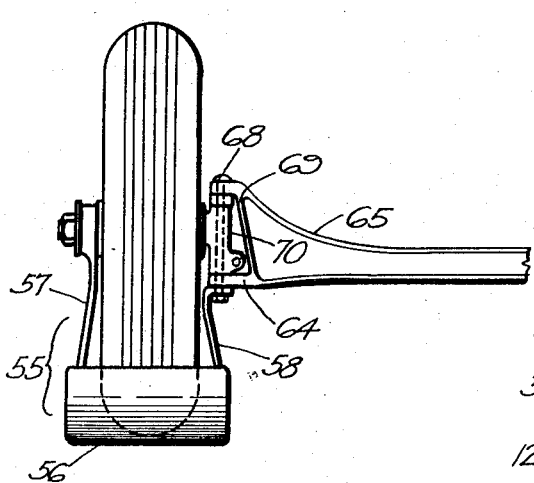
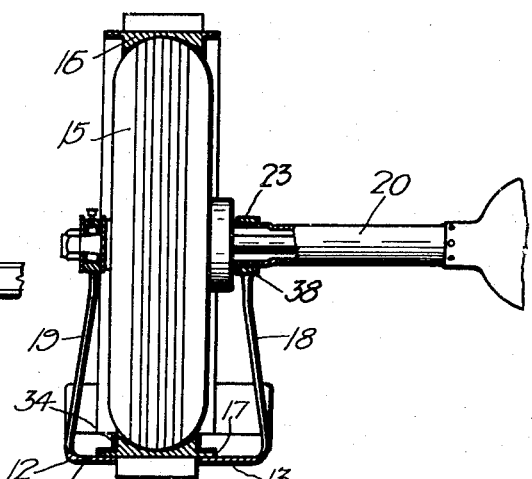
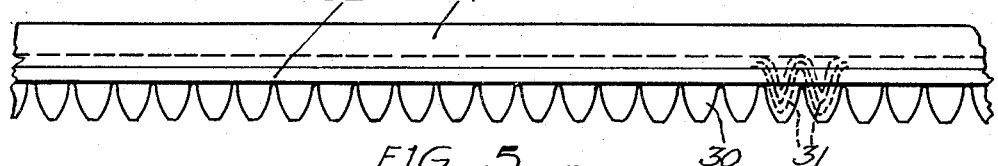
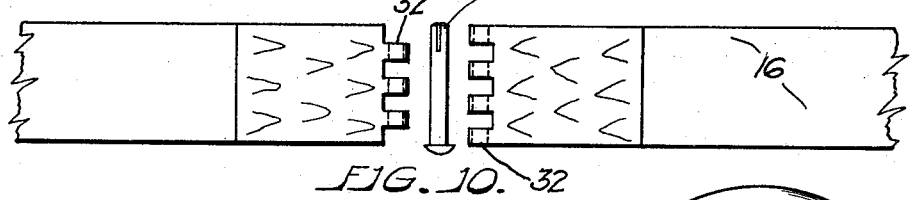
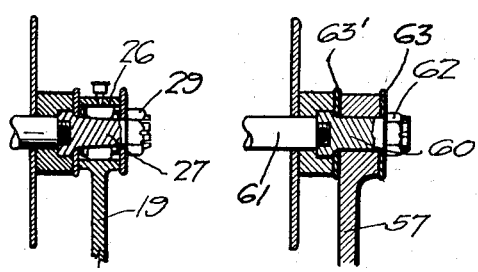
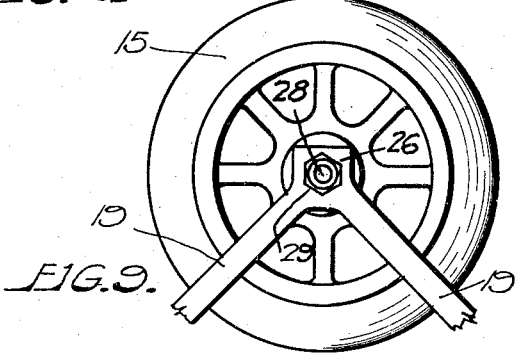
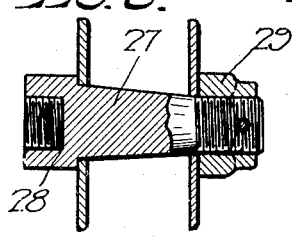
FRANK A. SPACSEK INVENTOR
BY Martin & Rendell
ATTORNEYS

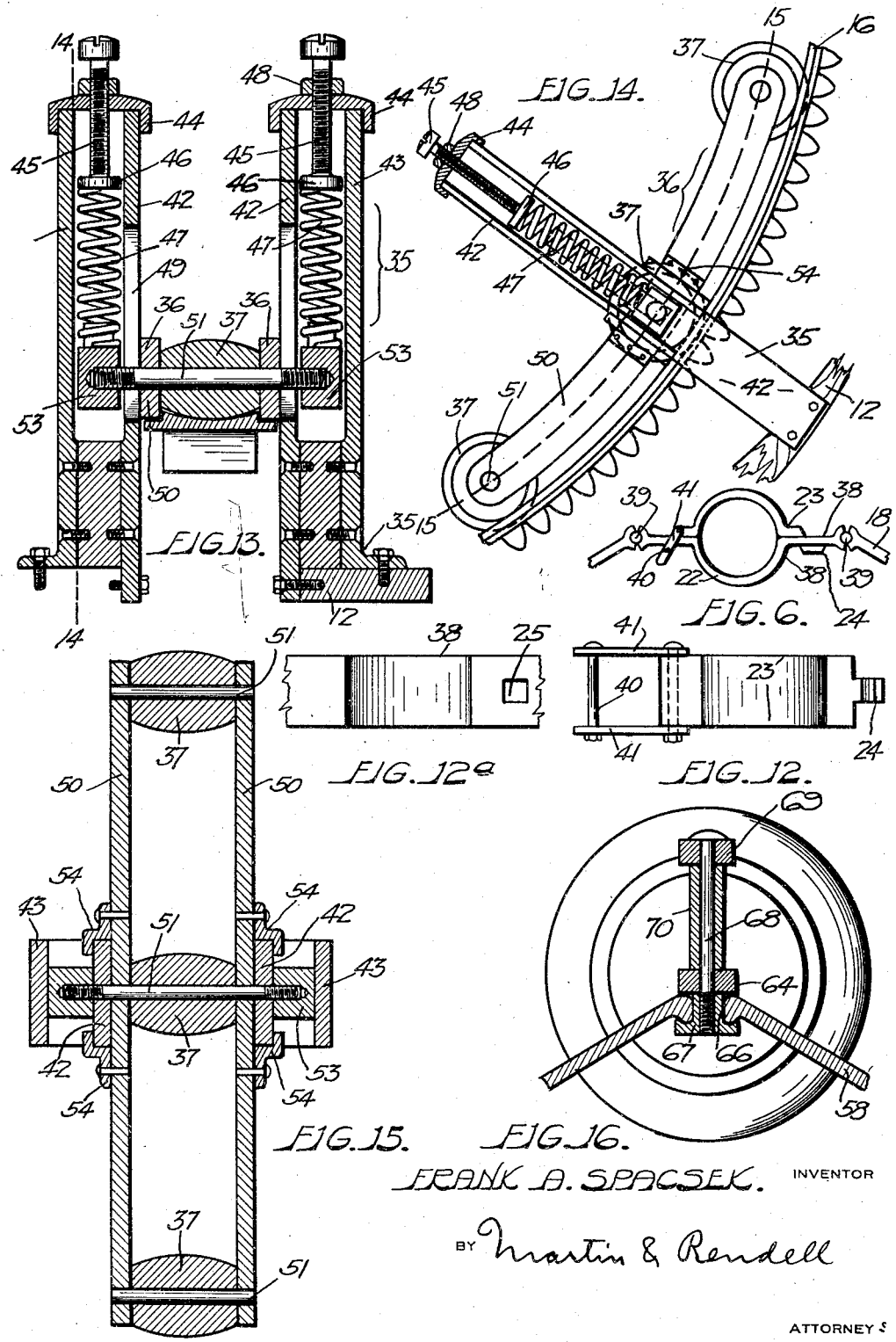

Patented Sept. 29, 1931

1,825,133

UNITED STATES PATENT OFFICE

FRANK A. SPACSEK, OF UTICA, NEW YORK

SLED ATTACHMENT FOR AUTOMOBILES

Application filed July 25, 1928. Serial No. 295,218.

My present invention relates to sled attachments for automobiles, including traction belts driven directly from the drive-wheel of the automobile.

The purpose of my invention is to provide an improved, simple and new construction of sled attachment for automobiles and particularly to provide an attachment of the type indicated, which can be readily applied by the ordinary automobile owner to the automobile and which will have its traction belt engaged and driven directly by the pneumatic tires upon the rear drive wheels of the automobile.

Further purposes are to provide an attachment of the class described which can be readily applied to a large variety of automobiles of different types and sizes, and which can be readily and quickly removed from the automobile; and further to provide a construction wherein the sled runners and the traction belt are of new and improved construction, and so co-operate with each other as to provide an effective sled runner to carry a large part of the weight of the car and yet will have ample traction surface so that the car can be operated in light snow or in rough roads. A still further purpose is to provide a simple form of keeping the traction belt extended length-wise and in direct contact both below and above the rear wheel with the tire of the rear wheel.

Fig. 3 is a front or rear elevation of the drive-wheel and the attached parts of the automobile together with a vertical sectional view of the runners, traction belt and mountings connecting the same with the wheel of said drive-wheel.

Fig. 4 is a front or rear elevation of one of the front wheels of the automobile with the immediately adjacent parts of the car together with a showing in elevation of the runner used upon the said front wheel.

Fig. 5 is a side view of a length of the traction belt.

Fig. 6 is a vertical sectional view showing the connection of the attachment to the rear axle housing.

Fig. 7 is a longitudinal sectional view through the extension spindle at the outside of the wheel.

Fig. 8 is a vertical sectional view through the bearing box at the outside of the rear wheel.

Fig. 9 is a side elevation showing the connection of the attachment to the outside of the rear wheel.

Fig. 10 is a plan view of the belt pin and adjacent ends of the belt disconnected.

Fig. 11 is a vertical sectional view of the parts connecting the front runner to the outside of the front wheel.

Fig. 12 is a plan view on an enlarged scale of the bridge piece 23 shown in Fig. 6. Fig. 12ª is a plan view of part of the saddle plate 38.

Fig. 13 is an enlarged sectional view on line 13—13 of Fig. 2.

Fig. 14 is a sectional view on line 14—14 of Fig. 13.

Fig. 15 is a sectional view on line 15—15 of Fig. 14.

Fig. 16 is a vertical sectional view showing the attachment of the inside frame members of the front wheel runner attachment to the adjacent parts of the automobile.

Figure 1:
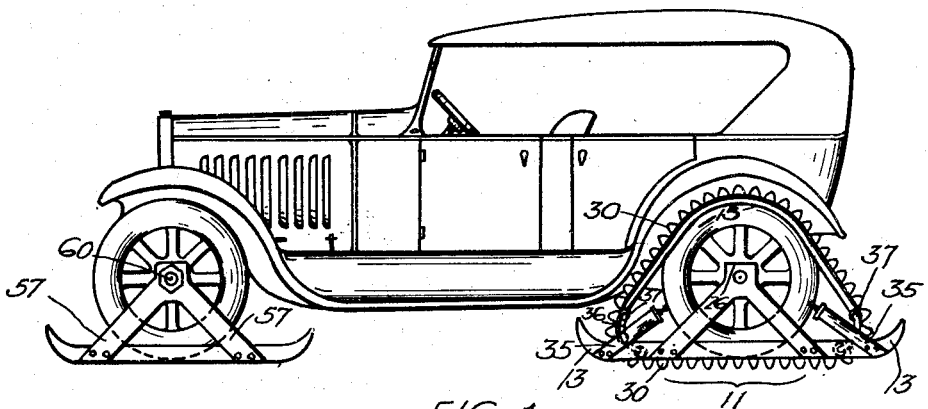
Fig. 1 is a side elevation of an automobile to which has been applied the attachments embodying several different forms of my invention.

Referring to the drawings for a more particular description it will be seen that for each rear wheel of the automobile there is provided and secured adjacent to said wheel 10 a combined runner and traction attachment generally denoted by the numeral 11 and consisting of a main frame 12 having inner and outer runners 13 and 14 respectively and carrying therebetween directly beneath the rubber tire 15 a length of the traction belt 16 the opposite edges of which are guided in horizontally extending guide-ways 17 provided in the said main frame above the runners.

The attachment 11 as a unit includes inner and outer pairs of upwardly slanting knees 18 and 19 respectively. The attachment 11 as a unit is detachably secured to the automobile by attaching the upper converging ends of the outer knees 19 to the outside of the wheel and by attaching the saddle plate 38 connecting the upper ends of the inner knees 18 to the rear axle housing 20 just inside the brake drum 21.

The upper ends of the inside knees 18 are pivotally connected as by rule joints 39 to the saddle plate 38 as particularly shown in Fig. 6. This saddle plate 38 is provided with a downwardly dropped seat 22 adapted to be placed beneath and fitted against the lower half of the rear axle housing 20 and secured thereto by a bridge piece 23. As particularly appears in Figs. 6, 12ᵃ and 12, the bridge piece 23 at its right hand end has its extremity of reduced width and offset downwardly and then extended to the right forming a hook 24. This hook is inserted into a centrally located eye 25 in the right hand flat end of the saddle plate 38 and then the top of the hook engages the bottom surface of the saddle plate in an obvious manner. The left hand end of the bridge piece 23 is provided on its opposite sides with pivotally connected links 41 which pass downwardly at the opposite sides of the saddle plate and therebelow are connected by a cross bolt 40, thus completing a readily attachable and detachable fastening mechanism. The central portion of the bridge piece 23 is upwardly curved to fit against the upper half of the rear axle housing 20. It will be seen that these inner knees 18 can be attached to and detached from the rear axle housing without removing the rear wheel from the automobile.

The detachable connection of the outside knees to the outside of the rear wheels is particularly shown in Figs. 7-9.

The outside knees 19 are provided at their upper converging ends with a bearing box 26, the horizontally arranged bearing of which fits onto the outwardly extending journal 27 of an extension spindle 28 (Fig. 7) provided and fitted upon the wheel in place of the ordinary lock nut. A lock nut 29 holds the box 26 in place upon the extension spindle. Fig. 7 shows the construction of this extension spindle and Fig. 8 shows in vertical section the attachment of the bearing box 26 to this spindle and thereby to the outer side of the hub of the rear wheel.

The traction belt 16 as shown in several of the drawings consists of a long flat belt preferably of fabric imbedded in rubber and provided with closely spaced projections 30 upon the outer face of the belt and projecting crosswise thereof for nearly the width of the belt. Preferably the projections 30 will be formed integral with the belt as by having loops of fabric 31 extend from the belt to be then surrounded and covered by rubber vulcanized to said projections. It will be understood that the ends of the belt are provided with interfitting tongues 32 adapted to be securely but detachably connected by a crosswise extending pin 33 shown in Fig. 10. Upon the inner face of the traction belt there are provided two spaced inwardly extending ridges 34 adapted to fit more or less closely against the opposite curved portions of the tire to the sides of the central tread portion thereof so as to aid in keeping the belt upon the top of the tire and so as to increase the contact of the tire with the belt both at the lower point and upper point of engagement of the wheel with the belt.

Forward and back of the long level portion of the runners 13 and 14 the said runners are sloped upwardly at each end and to each pair of these upwardly extended ends of the runners (which are really parts of the main frame) there are attached oppositely placed brackets 35 placed at the inner side and the outer side respectively of the belt.

Between the two brackets 35 at each end of the frame there is mounted an adjustable and spring tensioned extension traction frame 36 carrying several spaced rollers 37 which serve to guide the traction belt 16 from the straight guideways 17 near the ground upwardly in a curved direction toward the upper portion of the tire. As the forward and rear extension frames and their rollers and supporting brackets 35 are similar, a description of only one of these extension frames need be given and as the two brackets 35 at each end are of similar construction only one of said brackets needs to be described in detail.

As particularly illustrated in Figs. 2 and 13-15, a bracket 35 is secured to each of the upwardly curved or slanting portions of the runner or frame 12. The bracket 35 includes two spaced bars 42 and 43 disposed respectively towards and away from the extension frame 36, a cap 44 connecting the upper ends of the bars 42 and 43, an adjusting screw 45 extending through a screw-threaded aperture in the cap 44 with its inner end provided with an enlargement 46 which bears against the coiled spring 47 mounted between the two bars 42 and 43. Above the cap 44 a lock nut 48 engages the screw 45 to maintain the desired adjustment of the screw. The inner bar 42 has a centrally located longitudinally extending slot 49.

The extension traction frame 36 consists of two spaced side plates 50 connected by a plurality, say three, of pins 51 with each pin forming the bearing for a roller 37. Preferably one pin and roller are mounted between the two side plates 50 midway the width of the bars 42 and 43 of the brackets 35 as shown in Figs. 13-15. The ends of this middle pin 51 are extended beyond the opposite side plates 50 through the slot 49 in the bars 42 and into blocks 53 slidingly mounted between the members 42 and 43 of each bracket. The outer or upper ends of these blocks 53 as seen in Fig. 13 are engaged by the lower ends of the springs 47. The extension frame 36 is slidingly mounted between its two brackets 35 and held with its side plates 50 at the desired angle relative to said brackets 35 by means of Z-shaped clips 54 arranged in oppositely disposed pairs upon each side plate 50 of the extension frame and bearing against the opposite side edges of the inner bar 42 of each bracket with the inturned extremities of each clip 54 extending over and engaging the side of said bar away from the side plate 50 as particularly appears in sectional view Fig. 15.

Figure 2:
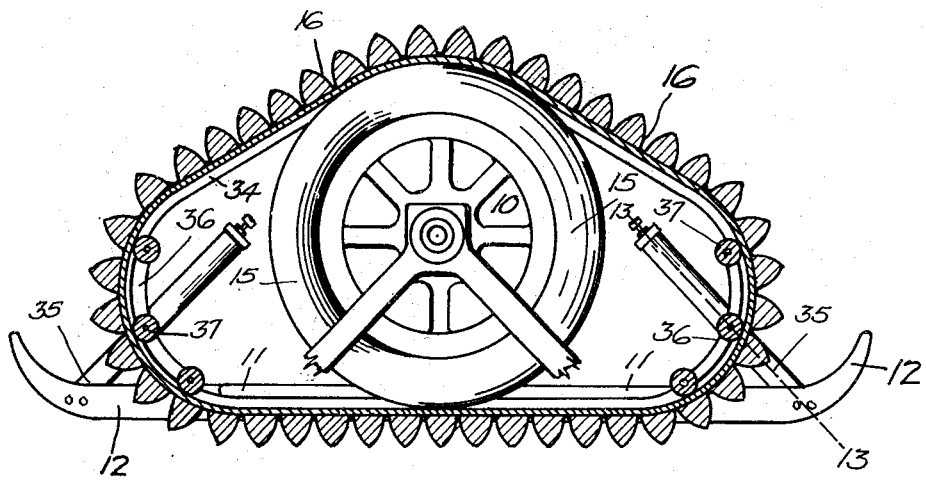
Fig. 2 is a side elevation on a larger scale of the rear tire and wheel and a longitudinal sectional view of the runner and traction belt and connected parts in position upon the rear tire and wheel of the automobile, but with the near parts of the sled and traction-frame removed in order more clearly to show the construction.

It will be understood that the arrangement of parts is such that the springs 47 tend to push the extension traction frames 36 outwardly and downwardly towards the upturned ends of the runners and thus as appears from Figs. 1 and 2 to hold the traction belt 16 stretched out or taut. Each extension frame, however, is yieldingly mounted so that it may yield inwardly if necessary. The degree of tension exerted upon the belt and the extent to which the frame may yield is determined by the adjustment of the screws 45 in an obvious manner.

It will be seen particularly that these adjustably tensioned frames 36 will help appreciably to relieve the strain upon the automobile and upon the runner and traction attachment during the process of starting the automobile or of going over rough ground.

It will be noticed particularly that I have provided means for the runner and traction attachment 11 as a unit to swing in a vertical plane at right angles to the axis of the rear axle or in other words for the front of the attachment to rise up a few inches as it meets a high spot and for the front to descend after such high point is passed. This swinging of the traction attachment is had in two ways, first outside of the rear wheel by the bearing box 26 at the upper end of the outer knees 19 rotating to the extent necessary upon the journal 27 of the extension spindle 28 fitted upon the wheel in place of the ordinary lock nut; secondly at the inside of the wheel such relative movement between the upper ends of the inner knees 18 and the rear axle housing 20 is had at the joints 39 between the upper ends of said knees 18 and the outer end of the saddle plate 38 rigidly secured to said axle housing. The joints 39 are of the "rule joint" or limited joint type having projecting stops upon the knees 18 and saddle plates 38 to limit the swinging motion to the desired extent. The joints 39 are sufficiently close to the axis of the rear axle to allow of such swinging action concurrently with the swinging action of the outer knees 19 upon the journal 27 without cramping or straining the parts of the device.

The whole rear runner and traction attachment 11 may be readily removed from the automobile and the automobile be at once in position to run without further assembling or adjustment thereof, by loosening and detaching the bridge piece 23 from the saddle plate 38 and by removing the lock nut 29 and then slipping the bearing box 26 from the journal 27 of extension spindle 28 and then replacing the extension spindle with the ordinary lock nut of the rear wheel of the automobile. The rear runners and traction attachment are attached in the same ready manner to the automobile by reversing the steps just mentioned. These operations it will be seen both of mounting and dismounting the runner and traction attachment are of a nature that can be readily carried out by any automobile owner of very moderate mechanical attainments and do not need the help of a skilled mechanic.

It will be understood of course that the provision for a bearing between the upper ends of the outer knees 19 of the traction attachment 11 relative to the rear wheel is required because during operation of the automobile when running the traction attachment the rear wheels will be rotated. The extension spindle 28 with its journal 29 supports the traction attachment outside of the rear wheels, but allows of constant rotation of the rear drive wheels of the automobile without tending to depress the forward end of the traction attachment.

The front runner attachment as a unit 55 consists of a runner 56 extending beneath the front wheel and with upturned forward and rearward ends and inner and outer frame members being outside knees 57 and inside knees 58, said separate sets of knees extending from the runner upwardly and towards each other. The upper ends of the outer knees 57 have a common upper end having a horizontal aperture which fits over an extension spindle 60 secured to the end of the stub shaft 61 in place of the ordinary lock nut holding the front wheel on said stub shaft. A lock nut 62 holds the said outer knees 57 in place upon the extension spindle 60 while a washer or similar member 63 interposed between the outer surface of the upper part of the said knees and said nut 62 and another washer 63' between the inner surface of the knees and the adjacent part of the wheel allow slight swinging motion of the knees relative to said nut and relative to the adjacent part of the front wheel. This swinging motion of the knees at this point upon the axis of the front wheel allows the front runner to adjust itself to inequalities on the ground as already explained with regard to the rear runner attachment. With the runner upon the front wheel it will be understood of course that the front wheels do not rotate so that no special ball bearing or anti friction bearing is necessary between the front wheel and the adjacent outer knees.

The inside knees 58 of the front runner attachment slant towards and come together at the top at the inside of the front wheels and immediately below the lower arm 64 of the front axle 65 as particularly appears in Figs. 4 and 16. At this point the knees are provided with a centrally arranged vertically extending opening 66 having a rounded or convex inner surface. The upper end of the knees 58 rest against the lower surface of the lower arm 64 and a socket-headed nut 67 has its smaller upward and cylindrical part extend through the aperture 66 of the knees. This socket nut engages the end of the front wheel bolt 68 projecting down through the upper arm 69 and the lower arm 64 already mentioned of the front axle 65 and through the spindle 70 carrying the usual stub shaft 61 already mentioned. It will be seen that this arrangement holds the upper ends of the inner knees to the frame of the automobile, but allows a slight swinging or rocking movement at the rounding inner surface of the aperture 66 of said knees against the cylindrical part of the nut 67 and immediately below the arm 64. This rocking joint is sufficiently close to the line of the axis of the front wheel to allow the front runner to swing automatically and adjust itself to inequalities on the road in conjunction with the swinging motion of the outer knees with the front wheel itself already mentioned, to prevent strain or racking of the runner or knees.

What I claim as new and desire to secure by Letters Patent is:

1. A sled and traction attachment for use with the rubber tires of the rear wheels of automobiles, comprising a frame straddling the said tire and wheel and removably attached to the axle housing on the inner side of said wheel and removably connected to the end of the rear axle on the outer side of the wheel, a runner on said frame adjacent the level of the bottom of the rubber tire, a guideway on the said frame adjacent said runner and a frictionally-driven traction belt having its lower part slidingly mounted in said frame guideway and frictionally, drivingly engaged on its inner surface by the lower part of said rubber tire and adapted to project below said runners to engage the ground, the upper part of said belt extending over the upper part of the rubber tire and being frictionally, drivingly engaged thereby.

2. A sled and traction attachment for use with the rubber tires of the rear wheels of automobiles, comprising a main frame straddling the said tire and wheel and removably and swingingly attached to the axle housing on the inner side of said wheel and removably and pivotally connected to the end of the rear axle on the outer side of the wheel, a runner on said frame adjacent the level of the bottom of the rubber tire, a guideway on the said frame adjacent said runner and a frictionally-driven traction belt having its lower part slidingly mounted in said frame guideway and frictionally, drivingly engaged on its inner surface by the lower part of said rubber tire and adapted to project below said runners to engage the ground, the upper part of said belt extending over the upper part of the rubber tire, an extension frame at the rear of the main frame and an extension frame at the front of the main frame, each of said extension frames having one end near the adjacent end of the main guideway and extending upwardly and away therefrom and including a plurality of spaced rollers rotatably secured thereon and adapted to support the belt in a curve leading at its upper end towards the top of the tire, said extension frames being slidingly mounted on brackets extending from the main frame and adjustable towards and from said belt and substantially at right angles thereto.

3. A sled and traction attachment for use with the rubber tires of the rear wheels of automobiles, comprising a main frame straddling the said tire and wheel and removably attached to the axle housing on the inner side of said wheel and removably connected to the end of the rear axle on the outer side of the wheel, a runner on said frame adjacent the level of the bottom of the rubber tire, a guideway on the said frame adjacent said runner, a frictionally-driven traction belt having its lower part slidingly mounted in said frame guideway and frictionally, drivingly engaged on its inner surface by the lower part of said rubber tire and adapted to project below said runners to engage the ground, the upper part of said belt extending over the upper part of the rubber tire, an extension frame at the rear of the main frame and an extension frame at the front of the main frame, each of said extension frames having one end near the adjacent end of the main guideway and extending upwardly and away therefrom and adapted to support the belt in a curve leading at its upper end towards the top of the tire, said extension frames being slidingly mounted on brackets extending from the main frame and adjustable towards and from said belt and substantially at right angles thereto.

4. A sled and traction attachment for use with the rubber tires of the rear wheels of automobiles, comprising a main frame straddling the said tire and wheel and removably attached to the axle housing on the inner side of said wheel and removably connected to the end of the rear axle on the outer side of the wheel, a runner on said frame adjacent the level of the bottom of the rubber tire, a guideway on the said frame adjacent said runner, a frictionally-driven traction belt having its lower part slidingly mounted in said frame guideway and frictionally, drivingly engaged on its inner surface by the lower part of said rubber tire and adapted to project below said runners to engage the ground, the upper part of said belt extending over the upper part of the rubber tire, an extension frame at the rear of the main frame and an extension frame at the front of the main frame, each of said extension frames having one end near the adjacent end of the main guideway and extending upwardly and away therefrom and adapted to support the belt in a curve leading at its upper end towards the top of the tire, said extension frames being slidingly mounted on brackets extending from the main frame and adjustable towards and from said belt and substantially at right angles thereto and springs cooperatively connected to said extension frames and yieldingly pushing said frames outwardly whereby the traction belt is held taut.

In witness whereof I have affixed my signature, this 21st day of July, 1928.

FRANK A. SPACSEK.